Patented Aug. 16, 1949

2,479,066

UNITED STATES PATENT OFFICE 2,479,066

PREPARATION OF MONO-ALKYL ESTERS OF TEREPHTHALIC ACID

William F. Gresham, Wilmington, Del., assignor to E. I. du Pont de Nemours & Company, Wilmington, Del., a corporation of Delaware No Drawing. Application January 15, 1947, Serial No. 722,300

3 Claims. (Cl. 260—475)

1

This invention relates to improvements in the preparation of esters of terephthalic acid and more particularly to an improved process for the preparation of n-butyl esters of terephthalic acid whereby losses of n-butanol to dehydration products such as di-n-butyl ether are decreased or completely avoided.

Although terephthalic acid is only very slightly soluble in alcohols the esterification thereof can be carried out by heating terephthalic acid with certain alcohols at the boiling point in the presence of acidic catalysts. However, appreciable losses of the alcohols to dehydration products, such as ethers, are frequently encountered. For example, in the esterification of terephthalic acid with n-butanol in the presence of a minimum quantity of sulfuric acid, about 15 to 20% of the n-butanol is lost by conversion to di-n-butyl ether. Still larger losses occur with alcohols higher than n-butanol.

The esters of terephthalic acid can be prepared quite readily by ester interchange reactions, using comparatively mild catalysts, but this procedure is disadvantageous because it is indirect, and because it requires a preliminary esterification of terephthalic acid.

The difficulties which are encountered in the esterification of terephthalic acid are quite serious economically, especially when the object is to prepare diesters of terephthalic acid, because in the preparation of these diesters it is preferable to employ a very large excess of the alcohol, and high percentage losses of the alcohol correspond to even larger losses per unit weight of the desired diester formed.

It is well known that strong organic acids such as formic acid or hydroxyacetic acid can be esterified by reaction with alcohols in the absence of catalysts. The relatively weak organic acids, such as terephthalic acid, do not, under ordinary circumstances, undergo non-catalytic esterification to any appreciable extent when treated with alcohols in the liquid phase.

An object of this invention is to provide a process whereby esters of terephthalic acid can be prepared without a substantial loss of the alcohol during the esterification reaction. A further object is to provide a novel process for the esterification of terephthalic acid with n-butanol, without the use of acidic catalysts. Other objects of the invention will appear hereinafter.

These objects are accomplished in accordance with this invention by heating terephthalic acid with an excess of an alkanol having from 1 to 4 carbon atoms per molecule in the liquid phase at

2 a temperature of about 225° to 350° C. under superatmospheric pressure (preferably exceeding 25 atmospheres) in the absence of a catalyst. In preferred embodiments the initial mol ratio of terephthalic acid to n-butanol should be within the range of about 1:6 to 1:20. The invention may be conducted conveniently at any pressure in excess of 25 atmospheres, pressures of about 50 to 700 atmospheres being preferred.

One of the surprising results achieved in accordance with the present invention is the preparation of mono-n-butyl terephthalate in virtually theoretical yields. The invention thus involves the discovery that very high yields of mono-n-butyl terephthalate can be obtained by heating terephthalic acid with a large excess of n-butanol at temperatures just below the decomposition temperature of terephthalic acid (melting point of terephthalic acid, 333° C., with decomposition), under pressures in excess of about 25 atmospheres. Optimum results are obtained at 250° to 300° C.

The invention is illustrated further by means of the following examples.

*Example 1.*—A mixture containing 50 grams of terephthalic acid and 178 grams of n-butanol was heated in a stainless steel shaker tube for one hour at a temperature of 250° C. under a pressure of 85 to 100 atmospheres. Distillation of the resulting product gave 260 cc. of an n-butanol fraction (B. P. 88° to 118° C.), which contained 7 cc. of water layer. The distillation residue was distilled under diminished pressure, yielding 36.7 grams of substantially pure mono-n-butyl terephthalate (B. P. 180° to 182° C. at 5 mm.). This mono-n-butyl terephthalate crystallized to a white solid when the distillate was cooled to room temperature. The yield of mono-n-butyl terephthalate was virtually 100%, based on the amount of terephthalic acid converted (conversion of terephthalic acid to mono-n-butyl terephthalate 44%).

*Example 2.*—A mixture containing 50 grams of terephthalic acid and 178 grams of n-butanol was heated at a temperature of 300° C. in a stainless steel shaker tube for one hour under a pressure of 250 to 280 atmospheres. The resulting mixture was withdrawn from the reaction vessel and distilled for recovery of n-butanol. Distillation of the residue under diminished pressure gave a fraction (B. P. 156° to 175° C. at 5 mm.) which was a mixture of mono-n-butyl and di-n-butyl terephthalate, the proportion of di-n-butyl terephthalate being quite small. The conversion of terephthalic acid to n-butyl esters was 76%, and the yield of n-butyl esters was about 96% of the theoretical, based on the amount of terephthalic acid not recovered.

It is to be understood that the above examples do not limit the invention but rather serve to illustrate certain preferred methods for practicing the same. Numerous modifications of the invention will occur to those who are skilled in the art. For example, the esterification may be carried out either batchwise or continuously, and means may be employed for withdrawing water from the reaction mixture while the esterification is in progress if desired. The esterification reaction may be conducted in any convenient reaction vessel such as a stirred autoclave or a high pressure still. If it is desired to produce a substantially quantitative yield of monoalkyl terephthalate, the esterification should not be prolonged beyond about 2 or 3 hours and the temperature should be carefully controlled so that it is close to the minimum required for non-catalytic esterification, namely about 250° C. If pure monoalkyl terephthalate is desired, it is important to employ the esterification conditions which give substantially theoretical yields of the monoester, since the separation of the monoester from the diester by distillation is extremely difficult, or virtually impossible, because of the closeness of their boiling points. Selective formation of the monoester is one of the unique advantages of one of the embodiments of this invention.

If desired, the esterification may be carried out in two or more stages; for example, mono-n-butyl terephthalate may be prepared non-catalytically as herein disclosed in the first stage, and this monoester may be converted to diester catalytically in a second stage. Suitable catalysts for carrying out the esterification of mono-n-butyl terephthalate to di-n-butyl terephthalate are the oxides of lead and zinc, or the salts of these metals with weak acids, especially acids having an ionization constant lower than 10⁻³, as disclosed in the copending application S. N. 722,299, filed January 15, 1947.

Since many embodiments of the invention may be made without departing from the spirit and scope thereof, it is to be understood that I do not limit myself except as set forth in the following claims.

I claim:

1. A process for the preparation of a monoalkyl ester of terephthalic acid which comprises heating terephthalic acid with an alkanol having from 1 to 4 carbon atoms per molecule in the proportions of 1:6 to 1:20 at a temperature of about 250° to 300° C. in the liquid phase under a pressure of about 25 to 500 atmospheres in the absence of a catalyst, whereby the monoalkyl ester of terephthalic acid is formed selectively, and thereafter separating monoalkyl ester of terephthalic acid from the resultant reaction mixture.

2. A process for the preparation of mono-n-butyl terephthalate which comprises heating terephthalic acid with n-butanol in the mol proportions of about 1:6 to 1:20 at a temperature of about 250° C. under a pressure of about 25 to 500 atmospheres for a reaction time not in excess of about three hours in the absence of a catalyst and thereafter separating mono-n-butyl terephthalate from the resulting reaction mixture.

3. A process for the esterification of terephthalic acid which comprises heating terephthalic acid with n-butanol in the mol proportions of about 1:6 to 1:20 at a temperature of about 250° C. under a pressure of about 25 to 500 atmospheres for about one hour, recovering unreacted n-butanol from the resulting product by distillation, and distilling under diminished pressure substantially pure mono-n-butyl terephthalate from the resulting distillation residue, said process being carried out in the absence of an esterification catalyst.

WILLIAM F. GRESHAM.

REFERENCES CITED

The following references are of record in the file of this patent:

UNITED STATES PATENTS

| Number | Name | Date |
|---|---|---|
| 1,732,392 | Wietzel | Oct. 22, 1929 |
| 1,993,736 | Graves et al. | Mar. 12, 1935 |
| 2,091,241 | Kvalnes | Aug. 24, 1937 |